(12) United States Patent
Pessa

(10) Patent No.: US 9,703,314 B2
(45) Date of Patent: Jul. 11, 2017

(54) METHOD AND APPARATUS FOR A VARIABLE FREQUENCY AND PHASE CLOCK GENERATION CIRCUIT

(71) Applicant: Telefonaktiebolaget L M Ericsson (publ), Stockholm (SE)

(72) Inventor: Marko Pessa, Oulu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 270 days.

(21) Appl. No.: 14/190,252

(22) Filed: Feb. 26, 2014

(65) Prior Publication Data

US 2015/0241905 A1    Aug. 27, 2015

(51) Int. Cl.
G06F 1/00 (2006.01)
G06F 1/08 (2006.01)
H04W 52/02 (2009.01)

(52) U.S. Cl.
CPC .......... *G06F 1/08* (2013.01); *H04W 52/0287* (2013.01); *Y02B 60/50* (2013.01)

(58) Field of Classification Search
CPC .............................................. G06F 1/04–1/10
See application file for complete search history.

(56) References Cited

U.S. PATENT DOCUMENTS

| | | | |
|---|---|---|---|
| 4,692,932 A | 9/1987 | Denhez et al. | |
| 5,481,697 A | 1/1996 | Mathews et al. | |
| 6,483,888 B1 | 11/2002 | Boerstler et al. | |
| 7,171,323 B2 * | 1/2007 | Shipton | B41J 2/04505 327/141 |
| 8,319,532 B2 * | 11/2012 | Hsueh | H03L 7/18 327/115 |
| 9,467,120 B1 * | 10/2016 | Song | G06F 1/3237 |
| 2003/0064703 A1 | 4/2003 | Toshida | |
| 2005/0213699 A1 * | 9/2005 | Boerstler | H03K 23/667 377/47 |
| 2007/0006150 A9 * | 1/2007 | Walmsley | B41J 2/04505 717/120 |
| 2007/0043966 A1 | 2/2007 | Chang et al. | |
| 2007/0083491 A1 * | 4/2007 | Walmsley | G06F 21/608 |
| 2010/0308874 A1 | 12/2010 | Seki et al. | |
| 2011/0109355 A1 * | 5/2011 | Sakaguchi | H03L 7/0814 327/157 |
| 2014/0184281 A1 * | 7/2014 | Danny | H03L 7/081 327/115 |

* cited by examiner

*Primary Examiner* — Mohammed Rehman
(74) *Attorney, Agent, or Firm* — Coats & Bennett, PLLC

(57) ABSTRACT

A clock generation circuit generates clock signals of a requested frequency and relative phase by dividing a reference clock signal by counting reference clock signal pulses in a counter circuit. The clock generation circuit changes the frequency, and optionally also the phase, of an output clock signal upon request, without generating glitches or missing pulses. The clock generation circuit does not alter the frequency of the output clock signal until a phase pulse associated with the requested phase is asserted, and the counter circuit is in a predetermined state, such as a reset state.

18 Claims, 10 Drawing Sheets

METHOD AND APPARATUS FOR A VARIABLE FREQUENCY AND PHASE CLOCK GENERATION CIRCUIT

FIELD OF INVENTION

The present invention relates generally to clock circuits for digital electronics, and in particular to a method and apparatus to change the frequency, and optionally the relative phase, of a clock signal without introducing transients.

BACKGROUND

Portable electronic devices are ubiquitous accoutrements in modern life. Cellular telephones, smartphones, satellite navigation receivers, e-book readers and tablet computers, wearable computers (e.g., glasses, wrist computing), cameras, and music players are just a few examples of the many types of portable electronic devices in widespread use. Portable electronic devices are powered by batteries—either replaceable batteries such as alkaline cells, or rechargeable batteries such as NiCd, NiMH, LiOn, or the like. In either case, the useful life of portable electronic devices is limited by available battery power, which decreases in proportion to the length of use of the device, and the level of power consumption during that use.

Trends in portable electronic device design exacerbate the problem of limited available power. First, device form factors tend to shrink, due to increasing integration of electronics and miniaturization of component parts, such as disk drives. This forces the size of the battery to shrink as well, which generally reduces the available energy storage capacity. Second, electronic devices are increasingly sophisticated, offering new applications, more sophisticated user interfaces, enhancements such as encryption, and the like. The additional software implementing these features requires increased computational power to execute, which translates to larger, or additional, processors and more memory. Finally, successive generations of portable electronic device often add additional features such as various modes of wireless connectivity, which may require the integration of additional chip sets and other electronics. An increase in the demand for power by more processors and circuits, coupled with ever-shrinking battery size and capacity, has made power management a critical area of optimization for portable electronic device designers.

Several approaches to power management are known in the art. One such approach is to identify circuits (or sub-circuits) that are not used for extended periods, and put them into a low-activity state, also referred to as a "sleep mode," even if other circuits in the device are fully active. As one example, the illuminated display screen of many devices will shut off after a (selectable) duration of no user interactivity. One way to shut down digital circuits is to isolate clocks signals from these circuits. Since storage elements within the digital circuits only change state in response to clock signal edges or levels, power-consuming electrical activity within the circuits effectively ceases.

A more sophisticated approach to the "sleep" technique is to match the frequency of a clock signal to the level of activity of a digital circuit. For example, a processor engaged in heavy computation may be clocked at a high frequency, to extract maximum performance. However, when the processor is performing merely background tasks, the frequency of its clock signal may be reduced without a user-noticeable degradation of performance, which concomitantly reduces the power consumed.

Another approach to power management is to vary the power supplied to various circuits (or sub-circuits) according to the instantaneous load of the circuit. In this manner, circuits that are engaged in computation or other activity are provided sufficient power to operate, and circuits experiencing a lighter load are provided with a lower level of current. This variable power supply approach is possible by dedicating switched mode power supplies to each circuit. As well known in the art, a switched mode power supply transfers discrete quanta of charge from a power source (such as a battery) into a power storage and integration device (such as an inductor or capacitor), from which the power is made available to the circuit. At high current loads, the power supply must switch charge at a higher frequency; at lower loads, a lower switching frequency will suffice. Thus, the power supply may vary the power provided to a circuit by changing its switching frequency.

Even when several discrete circuits of a portable electronic device are simultaneously active, it may be advantageous to balance the current drain from the battery over time—that is, reduce or eliminate current "surges" caused by simultaneous clocking of digital electronics in several independent circuits, and/or the simultaneous switching of charge from the battery by numerous power supplies. One way to achieve such balance is by staggering the relative phases of the clock signals distributed to the disparate circuits or power supplies.

A clock generation and management approach that provides flexibility in clock enablement, clock frequency, and relative phase for a plurality of discrete clock signals would be beneficial in power management for modern portable electronic devices. Simplistic approaches to such clock signal manipulation, however—such as simply "gating" clock signals with combinatorial logic—can produce "glitches," or transient voltage spikes, in the generated clock signals. These glitches can randomly cause some—but not all—digital storage devices to change state, which may have disastrous consequences as processors, state machines, status registers, and the like are clocked into unknown and unintended states. Accordingly, the ability to precisely control and synchronously change the frequency and relative phase of a plurality of clock signals, without introducing any glitches in the generated clock signals, stands as a major challenge in power management for portable digital electronic devices.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a clock generation circuit generates clock signals of a requested frequency and relative phase by dividing a reference clock signal by counting reference clock signal pulses in a counter circuit. The clock generation circuit changes the frequency, and optionally also the phase, of an output clock signal upon request, without generating glitches or missing pulses. The clock generation circuit does not alter the frequency of the output clock signal until a phase pulse associated with the requested phase is asserted, and the counter circuit is in a predetermined state. In one embodiment, the predetermined counter circuit state is the reset state.

One embodiment relates to a synchronous method of changing the frequency, and optionally the phase, of a first clock signal, without introducing transients. A reference clock signal is received. Two or more mutually exclusive phase pulses are cyclically generated from the reference clock signal, the phase pulses having a predetermined phase relationship to each other. An output clock signal of a first frequency is generated by dividing the reference clock signal by a first factor, by cyclically counting a corresponding first number of reference clock pulses. Information specifying a requested frequency and phase is received. The frequency of the output clock signal is synchronously changed according to the received information, only upon the conditions of an asserted value of a phase pulse corresponding to the requested phase and that the reference clock pulse count is in a predetermined state.

Another embodiment relates to a synchronous, programmable clock generator circuit. The clock generator circuit is operative to generate one or more output clock signals, each having a specified frequency and phase, and is further operative to change the frequency, and optionally the phase, of a given output clock signal without introducing transients. The clock generator circuit includes inputs operative to receive a reference clock signal, frequency and phase requests, and enable signals. The clock generator circuit also includes a phase generator circuit operative to cyclically generate two or more mutually exclusive phase pulses from the reference clock signal. The phase pulses have a predetermined phase relationship to each other. The clock generator circuit further includes one or more divider circuits, each operative to generate an output clock signal of a first frequency by dividing the reference clock signal by a first factor, by cyclically counting a corresponding first number of reference clock pulses. The clock generator circuit is operative to synchronously change the frequency of a selected output clock signal according to a received frequency and phase request only upon the conditions of an asserted value of a phase pulse corresponding to the requested phase and that the reference clock pulse count is in a predetermined state.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
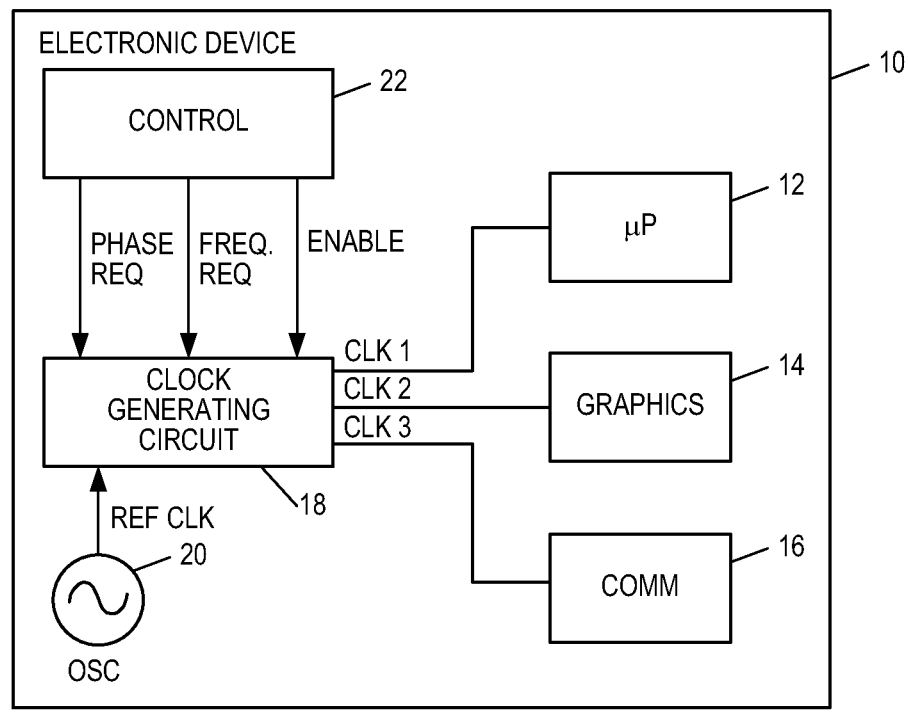
FIG. 1A is a functional block diagram of an electronic device.

FIG. 1A depicts an electronic device 10, which may be a battery-powered portable electronic device, as discussed above. The electronic device 10 includes three digital circuits and 12, 14, 16. As a representative, non-limiting example, the circuits may comprise a microprocessor or Digital Signal Processor (DSP) 12, a graphics processing engine 14, and a communication interface 16, which may for example comprise a wireless communication interface, including Radio Frequency (RF) processing circuits. A clock generating circuit 18 generates and distributes a plurality of clock signals to the digital circuits 12, 14, 16. The clock signals are generated by dividing a reference clock input, such as from an oscillator 20. The frequency and relative phase of each output clock signals CLK1, CLK2, and CLK3 are determined by frequency and phase request signals from a control circuit 22, which also generates per-clock enable signals. The clock generating circuit 18 may change the frequency, and optionally the relative phase, of any one or more output clock signals in a synchronous manner and without introducing glitches in the generated clock signals, in response to changes in the frequency and phase requests from the control circuit 22. The electronic device 10, of course, includes numerous additional circuits and components (user interface, data storage, power source such as a battery, and the like) not germane to the present disclosure and hence not depicted in FIG. 1A for clarity.

Figure 1B:
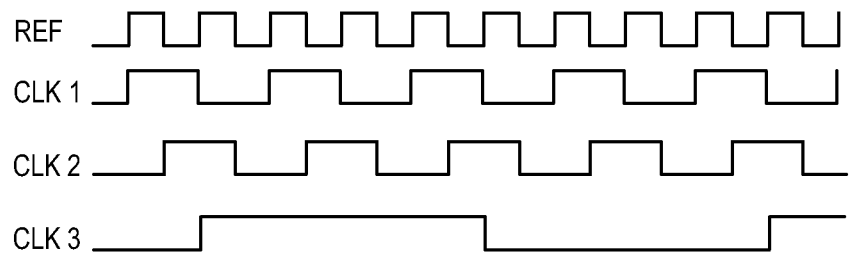
FIG. 1B is a timing diagram depicting various clock signals.

FIG. 1B depicts representative frequency and phase selections for the clock signals depicted in FIG. 1A. For example, the electronic device 10 may be engaged in an activity, such as gaming, in which both the processor 12 and the graphics engine 14 experience heavy computational loads. In this case, both CLK1 to the processor 12 and CLK2 to the graphics engine 14 are set to a high frequency—in this example, half of the reference clock frequency. However, to reduce the high instantaneous demand placed on a power supply by current surges, the clock signals CLK1 and CLK2 are offset, or have different relative phases. Since storage elements within the digital circuits 12, 14 change state (consuming power) on the rising edge of their respective clock signals, offsetting the rising edges of the CLK1 and CLK2 clock signals "evens out" the instantaneous current surge demanded from the power source (e.g., battery), compared to the case of CLK1 and CLK2 having the same relative phase.

In this example, the electronic device 10 is not actively engaged in communications. However, the communication interface 16 should not be completely powered down, or placed into sleep mode, as it must periodically monitor for communications received from another device. Since the latency in responding to such received communications is not critical, the communication interface 16 may be operated at a much lower switching frequency than the active processing circuits 12, 14. As FIG. 1B depicts, the frequency of the CLK3 clock signal is ⅛ the frequency of the reference clock. As discussed above, the CLK3 clock signal is offset in phase from either CLK1 or CLK2, to further smooth out instantaneous current demand from the battery.

Although FIG. 1A depicts the generated clock signals CLK1, CLK2, and CLK3 as clock inputs for the digital circuits 12, 14, 16, in some embodiments, the generated clock signals may instead drive the switches in dedicated switched mode power supplies providing supply voltages to various circuits 12, 14, 16. In this case, with reference to FIG. 1B, both the circuits 12 and 14 are experiencing high current demand, and their respective power supplies must transfer charge from a power source, such as a battery, to an energy storage element, such as an inductor or capacitor, at a high rate. In contrast, the circuit 16 is experiencing a low load, which its power supply may satisfy with a much lower switching frequency. In this case also, it is advantageous to operate the clocks at different relative phases, to spread out the current surges resulting from numerous switching power supplies pulling charge from the battery. In this case it is also critical that the clock generating circuit 18 be able to change the frequency and phase of each output clock without generating glitches or missing clock pulses, either of which may upset the internal state of power supply control circuits, which could drastically alter the output voltage applied to circuits 12, 14, 16.

The clock generating circuit 18 generates the output clock signals CLK1, CLK2, and CLK3 by dividing the reference clock signal by an integer greater than 1, in response to the frequency request input (in the embodiment described herein, the divider may be in the range of 2 to 8). The reference clock signal division is implemented by counting reference clock signal cycles in a counter circuit, and resetting the counter circuit when it reaches the divider value. A clock output circuit generates a clock signal from counter circuit outputs. The clock generating circuit 18 additionally generates a plurality of mutually exclusive phase pulses, and aligns each output clock signal with one of the phases, in response to the phase request input.

The clock generating circuit 18 is operative to change the frequency, and optionally also the relative phase, of any output clock signal, without generating a glitch. The clock generating circuit 18 does this by latching the frequency and phase requests, but not actually changing the output clock frequency until a predetermined condition is met: that a phase pulse corresponding to the requested phase is asserted, and the counter circuit is in a predetermined state, such as the reset state. In this manner, the clock generating circuit 18 simply begins counting reference clock pulses synchronously with the requested phase, and counts pulses up to the divider value associated with the requested frequency. Since these operations are fully synchronous, a clean output clock signal is generated, with no glitches or transients, at the requested frequency and phase.

Figure 2:
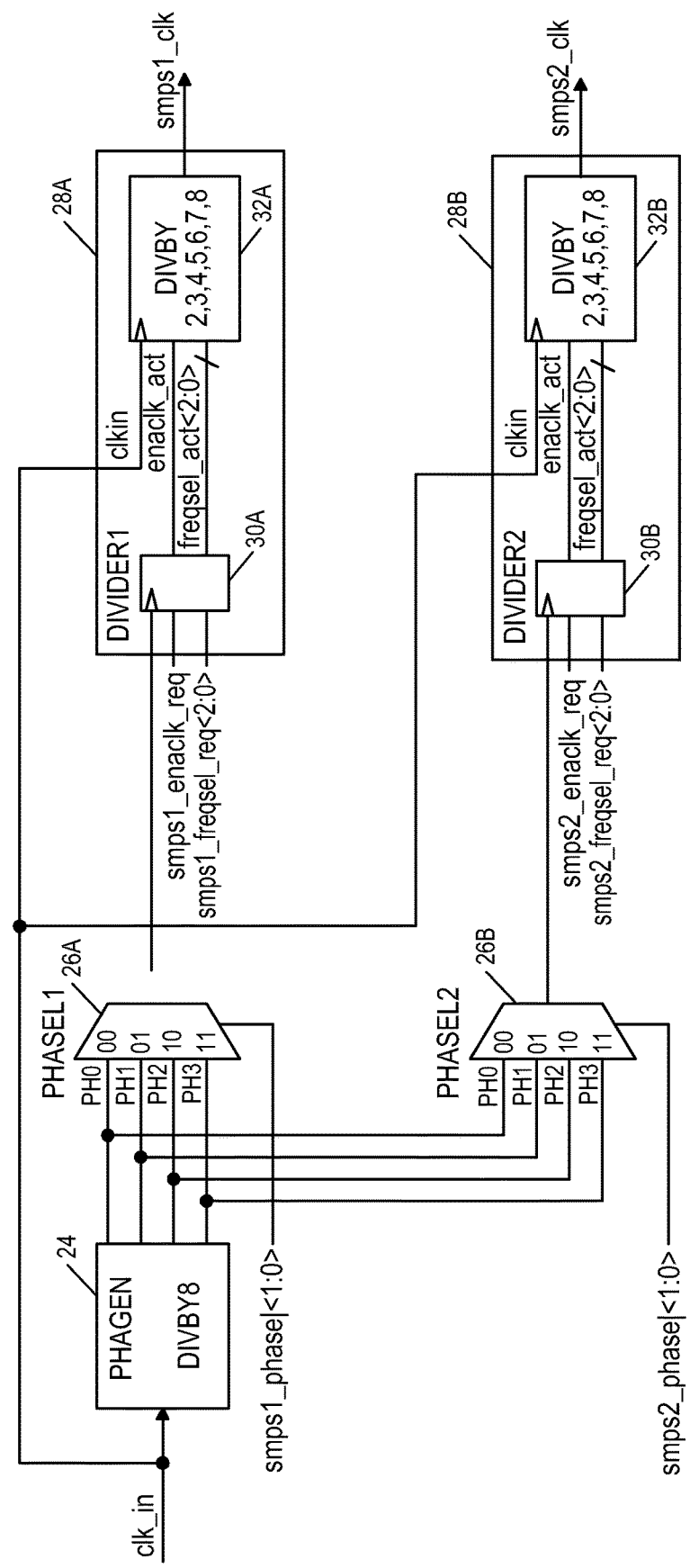
FIG. 2 is a functional block diagram of a clock generating circuit.

FIG. 2 is a partial functional block diagram of one representative embodiment of the clock generating circuit 18, depicting the generation of two representative output clock signals.

Figure 3:
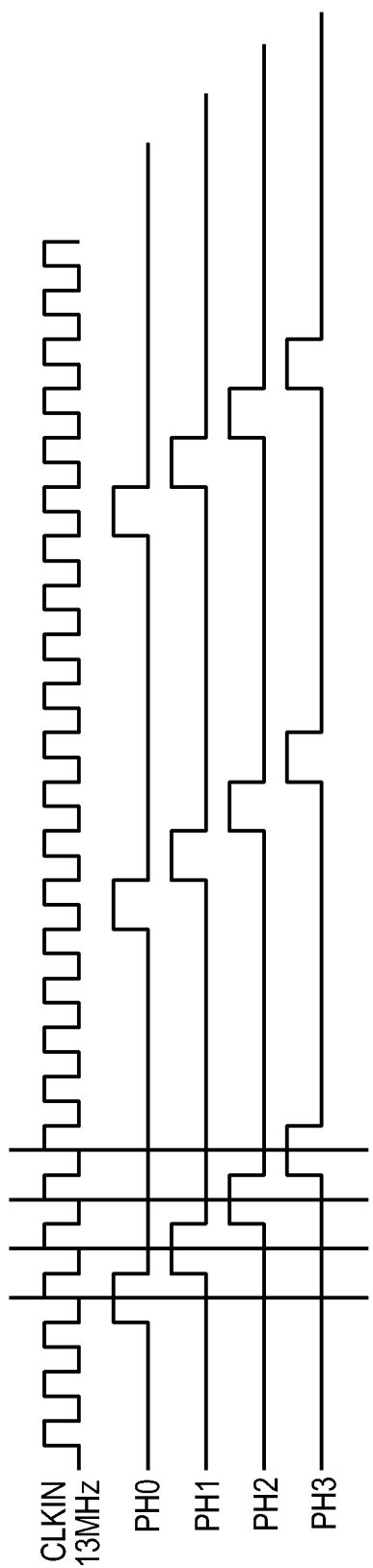
FIG. 3 is a timing diagram depicting various phase signals.

A phase generation circuit 24 generates a plurality of phase pulses PH0-PH3. The relative timing of the phase pulses is depicted in FIG. 3. In this embodiment, four phase pulses are generated during a phase generation cycle of eight reference clock cycles. During each phase generation cycle, each phase pulse PH0-PH3 is only generated once, to conserve power. In other embodiments, the phase pulses may be generated more often (e.g., a phase generation cycle of four reference clock cycles) or less often (e.g., a phase generation cycle of 12 or more reference clock cycles). Each phase pulse is asserted for one reference clock cycle. In this embodiment, the phase pulses PH0-PH3 are generated on falling edges of the reference clock signal. This ensures that each asserted phase pulse is stable at a rising edge of the reference clock signal. Of course, in an embodiment in which output clocks are synchronized to the falling edges of the reference clock signal, the phase pulses should be generated on rising reference clock signal edges, so that they are stable for the falling edges. A multiplexer 26A, 26B associated with each output clock signal selects the phase pulse to which the output clock will be aligned, in response to the phase request input.

A divider circuit 28A, 28B associated with each output clock signal receives the selected phase pulse and generates an output clock signal at a requested frequency, aligned to the selected phase. The divider circuit 28 is depicted in greater detail in FIG. 4.

A synchronization circuit 30 uses the selected phase pulse to latch the enable and frequency request inputs associated with the relevant output clock. This ensures that the counter circuit which divides the reference clock signal to generate the output clock signal only operates at the requested phase.

Figure 4:
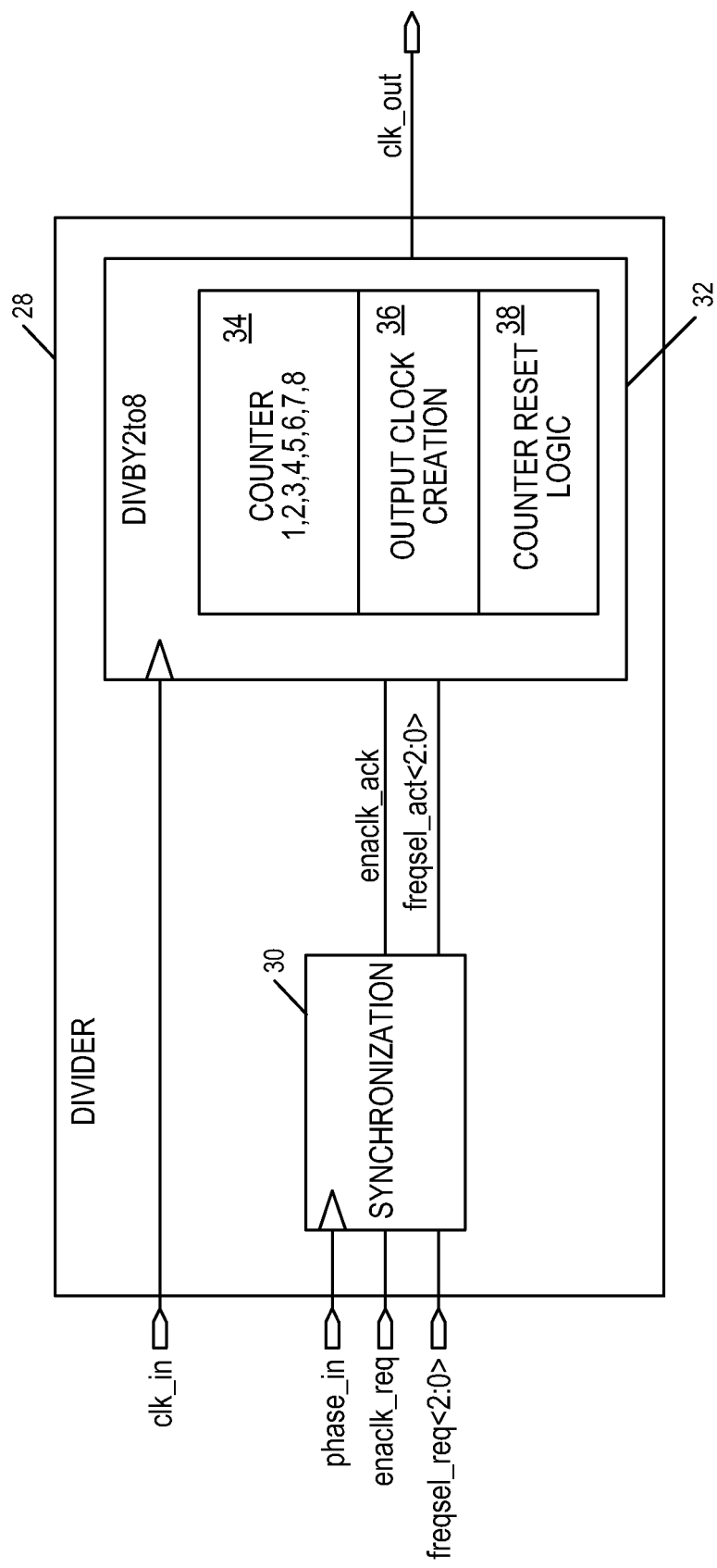
FIG. 4 is a functional block diagram of a clock divider circuit.

The clock enable and requested frequency signals are inputs to a divide-by-n block 32, which is operative to divide the reference clock signal by a requested factor—in this embodiment ranging from 2 to 8—using a counter circuit, and to generate an output clock signal based on the counter circuit outputs. As depicted in FIG. 4, the divide-by-n block 32 includes a counter circuit 34, an output clock creation circuit 36, and counter reset logic 38. These circuits are depicted in greater detail in FIGS. 5A, 5B, and 5C, respectively.

Figure 5A:
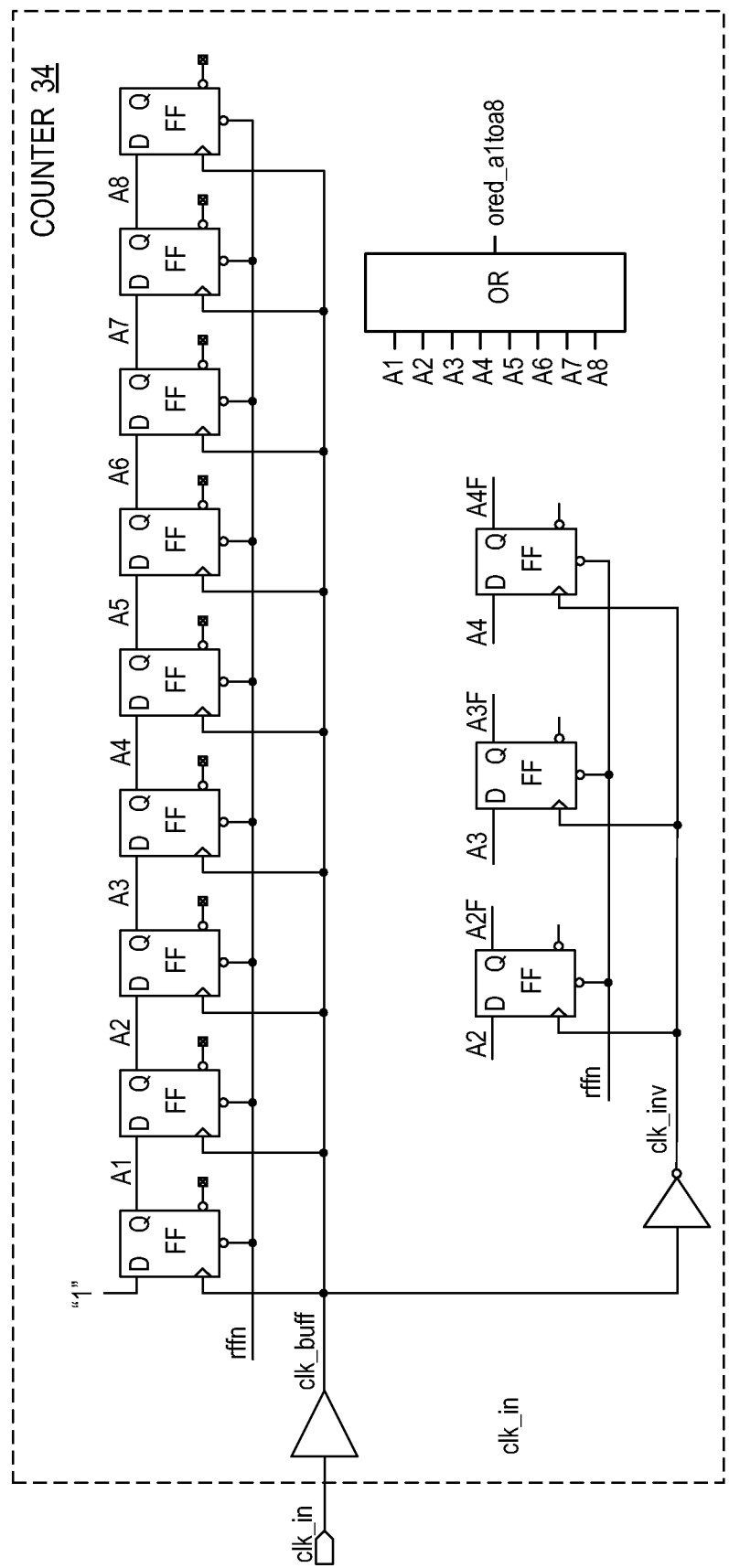
FIG. 5A is a functional block diagram of a counter circuit of a divide-by-n block of the divider circuit of FIG. 4.

The counter circuit 34, depicted in FIG. 5A, includes a "thermometer" style cascade of flip-flops triggered by the rising edge of the reference clock signal, with the D input of the first flip-flop tied to a logical 1. After being reset, the first flip-flop will clock a 1 at its output, which will propagate to the second flip-flop in the next cycle, and so on, generating the sequence: 10000000, 11000000, 11100000, 11110000, . . . . The three lower flip-flops capture selected outputs of the thermometer counter on the falling edge of the reference clock signal. These are used to generate clocks having a 50% duty cycle when using odd divider values; they may be omitted in embodiments where a 50% duty cycle for the clock signal is not required. An OR gate generates the signal ored_a1toa8, which is low only when the counter circuit 34 is in a reset state (i.e. 00000000).

Figure 5B:
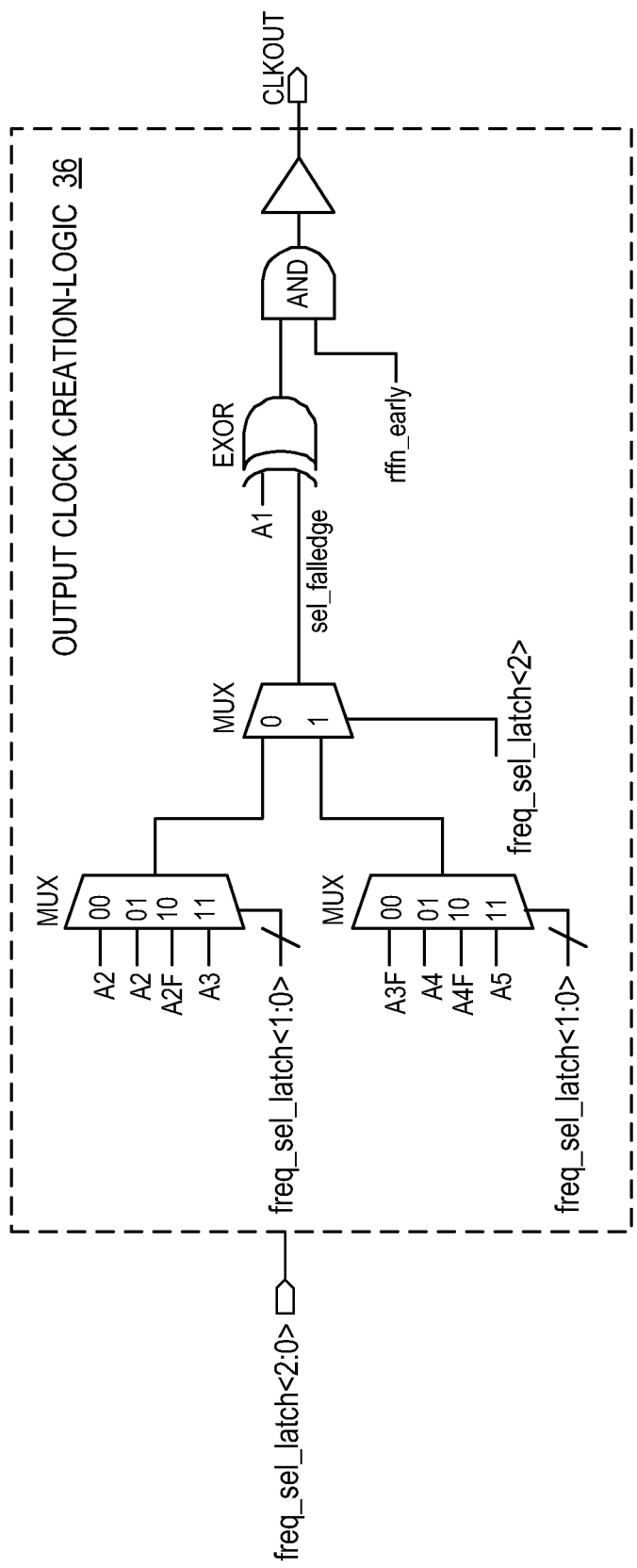
FIG. 5B is a functional block diagram of an output clock creation circuit of a divide-by-n block of the divider circuit of FIG. 4.

The output clock creation circuit 36, depicted in FIG. 5B, selects one of the counter circuit 34 outputs, based on the latched frequency selection bits, and through combinatorial logic generates the output clock signal at the requested frequency. The duty cycle can be tuned to be very nearly 50%.

Figure 5C:
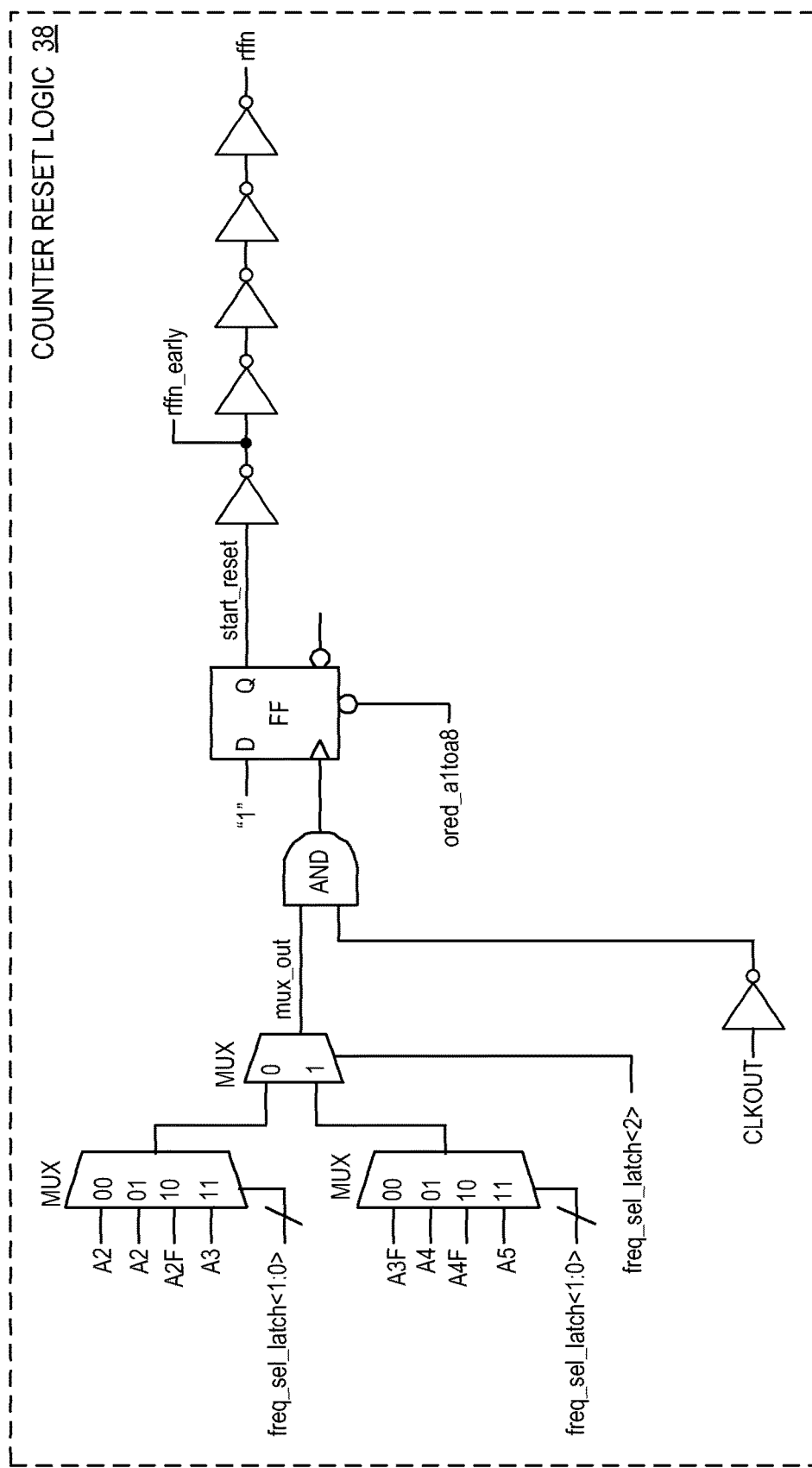
FIG. 5C is a functional block diagram of counter reset logic of a divide-by-n block of the divider circuit of FIG. 4.

The counter reset circuit 38, depicted in FIG. 5C, compares the clock output signal with selected counter circuit 34 outputs, based on the latched frequency selection bits, and clocks a 1 into a flip-flop to generate a reset state, which is only cleared (by the ored_a1toa8 signal) when the counter circuit 34 is reset. The asserted-low counter reset signal rffn is delayed by a series of inverters. An early version of the reset signal rffn_early holds the clock output low until the counter circuit 34 is reset.

Acting together, the counter circuit 34, the output clock creation circuit 36, and the counter reset circuit 38 generate an output clock signal at a frequency determined by dividing the reference clock signal by an integer divider value—from 2 to 8 in the embodiment depicted. Assuming a 13 MHz reference clock frequency, for example, the clock generating circuit 18 can generate clocks signals at the frequencies depicted in Table 1, each at any of four relative phases.

TABLE 1

Available Frequencies Using 13 MHz Reference Clock Signal

| Divisor | Frequency [MHz] |
|---|---|
| 2 | 6.5 |
| 3 | 4.333 |
| 4 | 3.25 |
| 5 | 2.6 |
| 6 | 2.17 |
| 7 | 1.86 |
| 8 | 1.625 |

Figure 6:
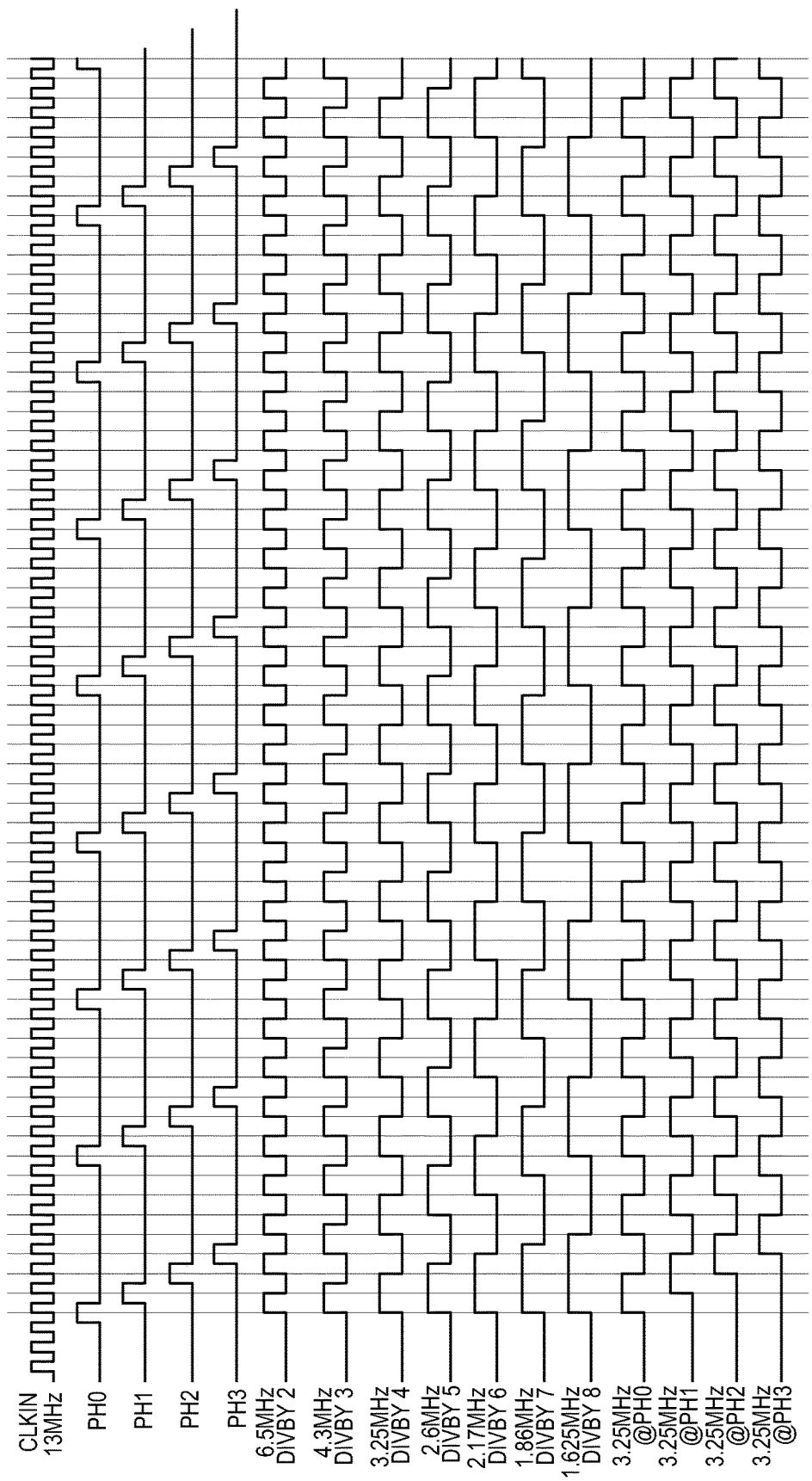
FIG. 6 is a timing diagram depicting clock signals at different frequencies.
Figure 8:
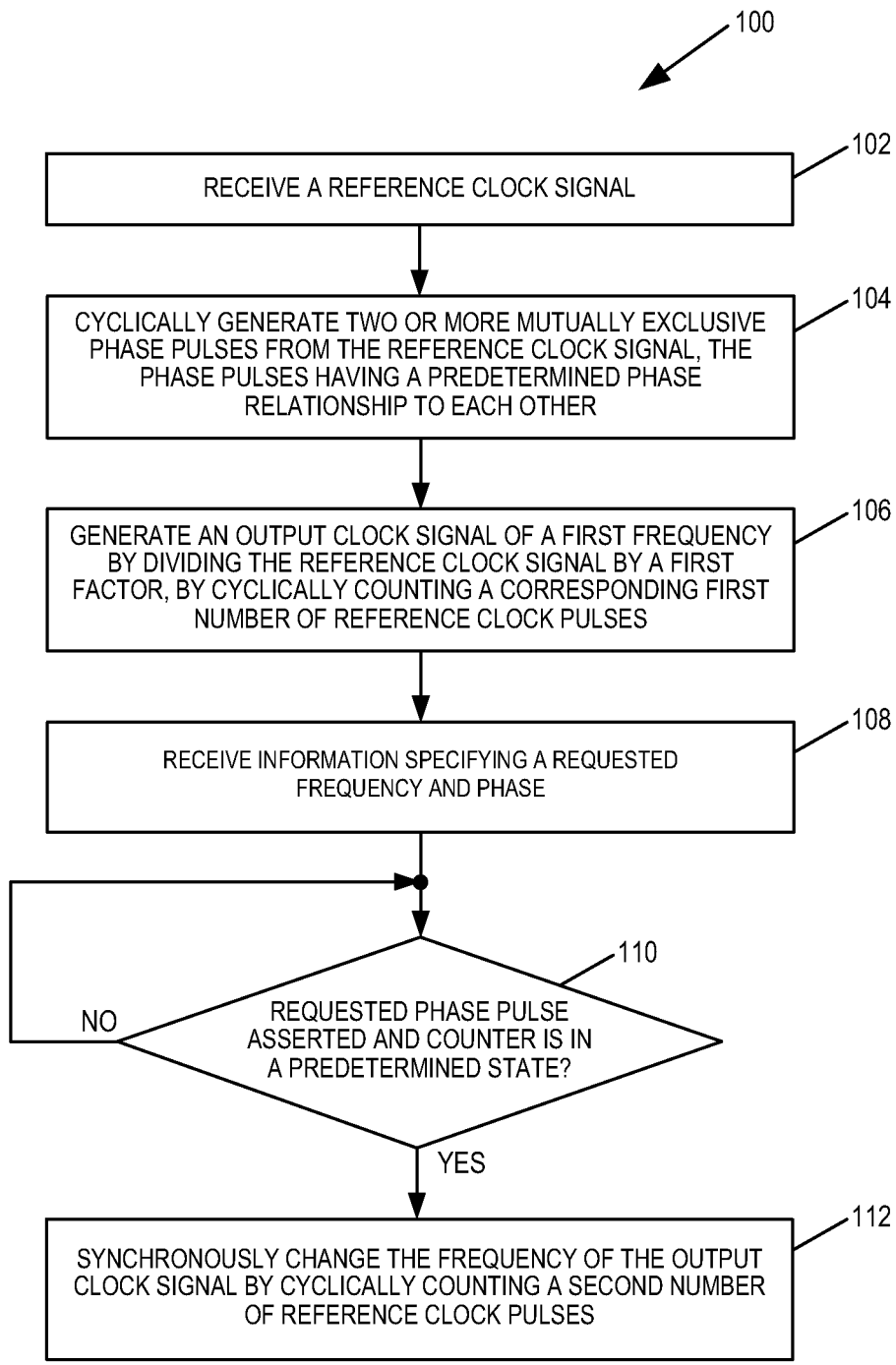
FIG. 8 is a flow diagram of a method of changing the frequency of a clock signal.

FIG. 6 depicts the reference clock signal (at 13 MHz); the four phase pulses PH0-PH3; and output clock signals at each of the frequencies listed in Table 1, all synchronized to the same phase (PH0). Note that the output clock signals using odd divider values transition from high to low state on a falling edge of the reference clock signal. FIG. 8 also depicts four 3.25 MHz output clocks, one synchronized to each of the four available relative phases.

Figure 7:
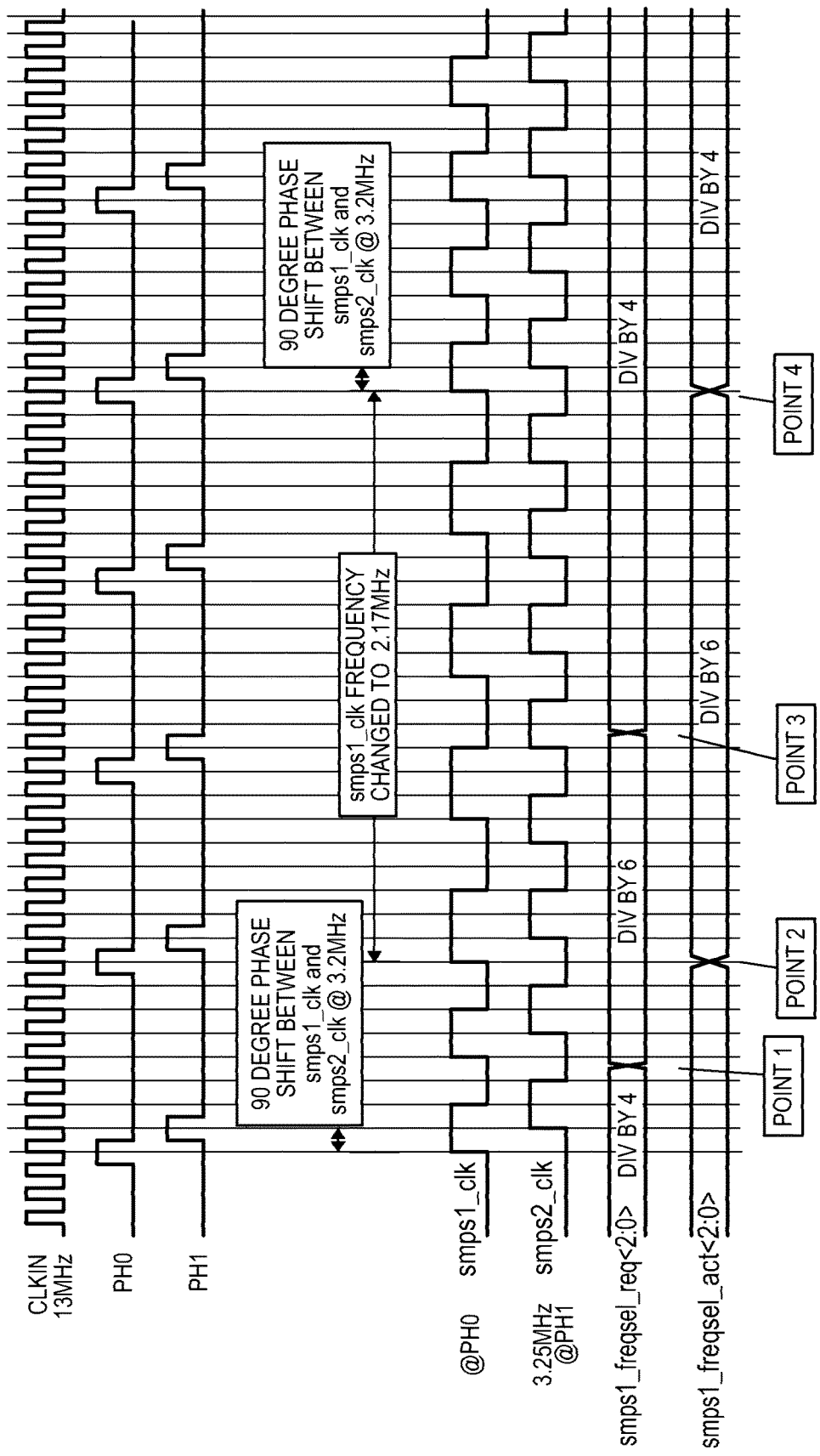
FIG. 7 is a timing diagram depicting one clock signal changing frequency.

FIG. 7 depicts a representative change in frequency for one output clock signal. Initially, both output clocks smps1_clk and smps2_clk are running at 3.25 MHz, i.e, the reference clock (at 13 MHz) divided by four. The first clock smps1_clk is aligned with phase 0 and the second clock smps2_clk is aligned with phase 1, so the two have a 90-degree relative phase shift. At the time marked point 1 the clock generating circuit 18 receives a request to change the smps1_clk divider from four to six (i.e, from 3.25 MHz to 2.17 MHz). The actual divider value change takes place at the time marked point 2, as that is the first moment when the phase pulse PH0 is at asserted and the counter circuit 34 is in a reset state—i.e, it starts counting from the beginning. At this point, the frequency can be changed so that there will be no glitch or perturbation of the clock signal—the counter circuit 34 begins counting its next cycle, but it is simply reset upon reaching a different value than before the frequency change.

At the time marked point 3 the clock generating circuit 18 again receives a request to change the divider value, this time back to four, to return to the original frequency. The first point at which the counter circuit 34 achieves the condition that PH0 is asserted and the counter circuit 34 is in a reset state is at point 4. Beginning at the time marked point 4, the first clock smps1_clk returns to a frequency of 3.25 MHz by again dividing the reference clock signal by four. Because the counter is beginning a new count cycle from the reset state, there is no glitch or missing pulse in the output clock signal. Also note that the phase relation between the two clock signals smps1_clk and smps2_clk is the same as in the original clocks, before the frequency change.

FIG. 8 depicts a synchronous method 100, performed by a clock generating circuit 18, of changing the frequency, and optionally the phase, of a first clock signal, without introducing transients. The clock generating circuit 18 receives a reference clock signal (block 102), and cyclically generates two or more mutually exclusive phase pulses from the reference clock signal, wherein the phase pulses have a predetermined phase relationship to each other (block 104). The clock generating circuit 18 generates an output clock signal of a first frequency by dividing the reference clock signal by a first factor, by cyclically counting a corresponding first number of reference clock pulses (block 106). At some point, the clock generating circuit 18 receives information specifying a requested frequency and phase (block 108). This information may specify, e.g., an output clock, a frequency divider, and a phase identifier. If the clock generating circuit 18 is not in the condition that the requested phase pulse is asserted and the counter circuit 34 is in a predetermined state (block 110), the clock generating circuit 18 does not change anything, and continues to generate the clock output signal at the first frequency. The predetermined state of the counter circuit 34, in one embodiment, is the reset state. When the counter circuit 34 reaches the predetermined state at the same time that the requested phase pulse is asserted (block 110), then the clock generating circuit 18 synchronously changes the frequency of the output clock signal by cyclically counting a corresponding second number of reference clock pulses (block 112).

Embodiments of the present invention present the advantages, over prior art clock management techniques, of changing the frequency of a clock signal without introducing glitches or missing pulses, and of aligning the clock signal to a selected relative phase. These features are advantageous in a variety of applications, including generating clock signals for switched mode power supplies as well as generating clock signals for digital circuits.

One characteristic of the inventive clock generating circuit 18 that may restrict its applicability for some applications is an unpredictable delay between the time a frequency (and optionally phase) change is requested, and the time the clock signal actually changes. Because the clock generating circuit 18 holds the request until the conditions that the relevant phase pulse is asserted and the counter circuit 34 is in a predetermined state (such as reset), the frequency change of the output clock signal is not instantaneous. In some applications, such as tuning Radio Frequency circuits, where highly response frequency changes are required, the delay may be excessive. However, for most switched mode power supply or digital circuit applications, the frequency change is fast enough. For example, in the embodiment described above, with a 13 MHz reference clock and divisor values ranging from two to eight, the frequency change from any first frequency to any second frequency will always take place within $7 \times 8 / F_{clkin} = 4.3$ us. Retaining the original clock frequency for such short time has no impact on overall efficiency in most applications, and the benefit of a guaranteed glitch free transition outweighs any disadvantage in the change not being instantaneous.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A synchronous method of changing a frequency or phase, or both, of a first clock signal, without introducing transients, comprising:
   receiving a reference clock signal;
   cyclically generating two or more mutually exclusive phase pulses from the reference clock signal, the phase pulses having a predetermined phase relationship to each other;
   generating an output clock signal of a first frequency by dividing the reference clock signal by a first factor, by cyclically counting a corresponding first number of reference clock pulses;
   receiving information specifying a requested frequency and phase; and
   synchronously changing the frequency or phase, or both, of the output clock signal according to the received information, only when a phase pulse corresponding to a requested phase is asserted and the reference clock pulse count is in a predetermined state.

2. The method of claim 1 wherein the predetermined state of the reference clock pulse count is a reset state.

3. The method of claim 1 wherein synchronously changing the frequency of the output clock signal comprises generating an output clock signal of a second frequency, different from the first frequency, by dividing the reference clock signal by a second factor, by cyclically counting a corresponding second number of reference clock pulses.

4. The method of claim 1 further comprising storing the requested frequency and phase information until conditions are satisfied.

5. The method of claim 1 wherein cyclically generating two or more phase pulses from the reference clock signal comprises generating the phase pulses such that their state is stable at each rising edge of the reference clock signal.

6. The method of claim 5 wherein generating the phase pulses having a stable state at each reference clock signal rising edge comprises changing a state of the phase pulses at a falling edge of the reference clock signal.

7. The method of claim 1, wherein generating an output clock signal by cyclically counting a predetermined number of reference clock pulses comprises clocking a high value into the beginning of a series-connected plurality of storage elements on rising edges of the reference clock signal, and resetting the plurality of storage elements upon reaching the predetermined number of reference clock pulses.

8. The method of claim 7, further comprising
   storing selected outputs of the series-connected plurality of storage elements on falling edges of the reference clock signal; and
   selectively combining outputs of rising edge and falling edge triggered storage elements, in response to the requested frequency, to generate an output clock signal having a substantially 50% duty cycle for all requested frequencies.

9. A synchronous, programmable clock generator circuit operative to generate one or more output clock signals, each having a specified frequency and phase, and further operative to change the frequency or phase, or both, of a given output clock signal without introducing transients, the circuit comprising:
   an input operative to receive a reference clock signal;
   inputs operative to receive frequency and phase requests, and enable signals;
   a phase generator circuit operative to cyclically generate two or more mutually exclusive phase pulses from the reference clock signal, the phase pulses having a predetermined phase relationship to each other; and
   one or more divider circuits, each operative to generate an output clock signal of a first frequency by dividing the reference clock signal by a first factor, by cyclically counting a corresponding first number of reference clock pulses;
   wherein the clock generator circuit is operative to synchronously change the frequency or phase, or both, of a selected output clock signal according to a received frequency and phase request only when a phase pulse corresponding to the requested phase is asserted and the reference clock pulse count is in a predetermined state.

10. The clock generator circuit of claim 9 further comprising a selector associated with each divider circuit, each selector operative to select a phase pulse from the phase generator circuit in response to a phase request and enable signal.

11. The clock generator circuit of claim 9 wherein each divider circuit comprises:
    a synchronization circuit operative to latch frequency request and enable signals upon
    assertion of a phase pulse corresponding to the phase request; and a divide-by-n block operative to generate the output clock signal in response to the latched frequency request signal.

12. The clock generator circuit of claim 11 wherein each divide-by-n block comprises:
    a counter circuit operative to count a predetermined number of reference clock cycles; an output clock creation circuit operative to generate the output clock signal based on outputs of the counter circuit and the latched frequency request signal; and counter reset logic operative to reset the counter circuit when the counter circuit reaches a count determined by the latched frequency request signal.

13. The clock generator circuit of claim 9 wherein the divider circuit is operative to synchronously change the frequency of the output clock signal by generating an output clock signal of a second frequency, different from the first frequency, by dividing the reference clock signal by a second factor, by cyclically counting a corresponding second number of reference clock pulses.

14. The clock generator circuit of claim 9 wherein the phase generator circuit is operative to cyclically generate two or more phase pulses from the reference clock signal by generating each phase pulse such that its state is stable at each rising edge of the reference clock signal.

15. The clock generator circuit of claim 14 wherein the phase generator circuit is operative to generate the phase pulses having a stable state at each reference clock signal rising edge by changing the state of each phase pulse at a falling edge of the reference clock signal.

16. The clock generator circuit of claim 9, wherein each divider circuit is operative to generate an output clock signal by cyclically counting a predetermined number of reference clock pulses by clocking a high value into the beginning of a series-connected plurality of storage elements on rising edges of the reference clock signal, and resetting the plurality of storage elements upon reaching the predetermined number of reference clock pulses.

17. The clock generator circuit of claim 16, wherein each divider circuit is further operative to
store selected outputs of the series-connected plurality of storage elements on falling edges of the reference clock signal; and
selectively combine outputs of rising edge and falling edge triggered storage elements, in response to the requested frequency, to generate an output clock signal having a substantially 50% duty cycle for all requested frequencies.

18. A portable electronic device comprising:
a synchronous, programmable clock generator circuit operative to generate one or more output clock signals, each having a specified frequency and phase, and further operative to change the frequency or phase, or both, of a given output clock signal without introducing transients, the circuit comprising:
an input operative to receive a reference clock signal;
inputs operative to receive frequency and phase requests, and enable signals;
a phase generator circuit operative to cyclically generate two or more mutually exclusive phase pulses from the reference clock signal, the phase pulses having a predetermined phase relationship to each other; and
one or more divider circuits, each operative to generate an output clock signal of a first frequency by dividing the reference clock signal by a first factor, by cyclically counting a corresponding first number of reference clock pulses;
wherein the clock generator circuit is operative to synchronously change the frequency or phase, or both, of a selected output clock signal according to a received frequency and phase request only when a phase pulse corresponding to the requested phase is asserted and the reference clock pulse count is in a predetermined state.

* * * * *